(12) United States Patent
Tang et al.

(10) Patent No.: US 7,185,365 B2
(45) Date of Patent: Feb. 27, 2007

(54) SECURITY ENABLED NETWORK ACCESS CONTROL

(75) Inventors: Puqi Tang, Portland, OR (US); Hsin-Yuo Liu, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 776 days.

(21) Appl. No.: 10/109,605

(22) Filed: Mar. 27, 2002

(65) Prior Publication Data

US 2003/0188192 A1    Oct. 2, 2003

(51) Int. Cl.
G06F 13/00    (2006.01)
G06F 15/163   (2006.01)

(52) U.S. Cl. .................. 726/13; 713/150; 713/151; 713/152; 713/153; 713/154; 713/155; 713/180; 726/1; 726/2; 709/223; 709/238

(58) Field of Classification Search ........ 713/150–155, 713/180, 200–225; 709/220–225, 238; 726/1, 2, 13
See application file for complete search history.

(56) References Cited

U.S. PATENT DOCUMENTS

| | | | | |
|---|---|---|---|---|
| 5,530,854 A | | 6/1996 | Emery et al. ............ | 726/2 |
| 5,870,744 A | | 2/1999 | Sprague | |
| 5,884,025 A | * | 3/1999 | Baehr et al. ............ | 713/201 |
| 6,006,016 A | * | 12/1999 | Faigon et al. ........... | 714/48 |
| 6,006,253 A | | 12/1999 | Kumar et al. | |
| 6,041,355 A | | 3/2000 | Toga | |
| 6,076,168 A | * | 6/2000 | Fiveash et al. .......... | 713/201 |
| 6,088,803 A | | 7/2000 | Tso et al. | |
| 6,108,786 A | | 8/2000 | Knowlson | |
| 6,141,686 A | * | 10/2000 | Jackowski et al. ...... | 709/224 |
| 6,154,775 A | * | 11/2000 | Coss et al. ............. | 709/225 |
| 6,157,955 A | * | 12/2000 | Narad et al. ........... | 709/228 |
| 6,163,531 A | | 12/2000 | Kumar | |
| 6,185,625 B1 | | 2/2001 | Tso et al. | |
| 6,202,084 B1 | | 3/2001 | Kumar et al. | |
| 6,233,686 B1 | * | 5/2001 | Zenchelsky et al. ..... | 713/201 |

(Continued)

FOREIGN PATENT DOCUMENTS

GB    2317 792 B  *  1/1998

OTHER PUBLICATIONS

Sotiris Ioannidis, Angelos D. Keromytis, Steve M. Bellovin, Jonathan M. Smith, Implementing a distributed firewall, Proceedings of the 7th ACM conference on Computer and communications security, p. 190-199, Nov. 1-4, 2000, Athens.*

(Continued)

Primary Examiner—Taghi T. Arani
(74) Attorney, Agent, or Firm—Fish & Richardson P.C.

(57) ABSTRACT

An access control system including a network device having a plurality of network interfaces for receiving and transmitting packets of data, the network device including a forwarding element to apply filter rules to the packets, and a filter rule constructor engine associated with said forwarding element to receive access control rules and decryption information for a security protocol, derive from the access control rules and security information a set of filter rules to be applied to packet headers encrypted with the security protocol, and transmit the set of filter rules to the at least one forwarding element.

31 Claims, 8 Drawing Sheets

U.S. PATENT DOCUMENTS

| | | |
|---|---|---|
| 6,236,996 B1 | 5/2001 | Bapat et al. |
| 6,237,031 B1 | 5/2001 | Knauerhase et al. |
| 6,240,514 B1 | 5/2001 | Inoue et al. |
| 6,246,678 B1 | 6/2001 | Erb et al. |
| 6,289,459 B1 | 9/2001 | Fischer et al. |
| 6,292,798 B1 | 9/2001 | Dockter et al. |
| 6,304,904 B1 | 10/2001 | Sathyanarayan et al. |
| 6,304,973 B1 * | 10/2001 | Williams ................. 713/201 |
| 6,311,215 B1 | 10/2001 | Bakshi et al. |
| 6,347,376 B1 * | 2/2002 | Attwood et al. ............ 713/201 |
| 6,496,935 B1 * | 12/2002 | Fink et al. ................. 713/201 |
| 6,519,636 B2 * | 2/2003 | Engel et al. ............... 709/223 |
| 6,539,483 B1 | 3/2003 | Harrison et al. |
| 6,651,099 B1 * | 11/2003 | Dietz et al. ............... 709/224 |
| 6,697,872 B1 * | 2/2004 | Moberg et al. ............ 709/238 |
| 6,701,437 B1 * | 3/2004 | Hoke et al. ................ 726/15 |
| 6,708,218 B1 | 3/2004 | Ellington, Jr. et al. |
| 6,751,729 B1 * | 6/2004 | Giniger et al. ............. 713/153 |
| 6,915,437 B2 | 7/2005 | Swander et al. |
| 6,935,155 B2 | 8/2005 | Yasui et al. |
| 2002/0104020 A1 | 8/2002 | Strahm et al. |
| 2002/0163920 A1 | 11/2002 | Walker et al. |
| 2002/0169980 A1 * | 11/2002 | Brownell ................... 713/201 |
| 2002/0178355 A1 | 11/2002 | D'Sa et al. |
| 2003/0110377 A1 | 6/2003 | Chapman |
| 2003/0123452 A1 | 7/2003 | Cox et al. |
| 2003/0212901 A1 | 11/2003 | Mishra et al. |

OTHER PUBLICATIONS

Soriano et. al., A Software design and implementation for filtering, forwading and ciphering ins secure bridge, IEEE May 4-8, 1992, pp. 487-492.*

* cited by examiner

SECURITY ENABLED NETWORK ACCESS CONTROL

BACKGROUND

Networks of computers such as intranets, local and wide area networks, and the Internet exchange information in "packets." A packet includes data such as files and programs and can also include a header that contains information that identifies the packet and indicates its origin and destination. The header can further include network protocol identifiers and the version number of the protocol that is to be used to route the information through the network. The header can also contain information identifying the port on the source computer from which the packet was sent and the port on the destination computer to which the packet is to be sent.

Computers connected to the Internet can be given either a static or dynamic Internet Protocol, or IP, address. Packets exchanged through the Internet accordingly often include an IP source address, an IP destination address, and an IP protocol identifier in addition to source and destination port information.

Computer networks, including the Internet, control the exchange of packets in order to prevent the unauthorized disclosure, modification, or execution of data and programs on a networked computer. In packet-switching networks, this is often accomplished through the use of an Access Control List, or ACL, that contains filter rules which indicate whether a packet should be accepted or dropped based on the identifiers included in the packet header.

ACLs are typically implemented, or enforced, by a network device known as firewall. Firewalls are often a combination of software and hardware that receives a packet and then compares the source, destination, protocol and/or other identifiers in the packet header to determine which filter rule "correspond," or applies, to the packet. The firewall then applies the corresponding rules to the packet in the order they are set forth in a firewall rule table. A filter rule is applied by determining whether the identifiers set forth in the packet header match or fall within the range of values set forth in the filter rule for each identifier. If all of the packet header identifiers match the parameters set forth in a filter rule, an action, typically an ACCEPT/DROP action, is carried out on the packet. If the packet identifiers do not match the values specified in the corresponding filter rule, the next corresponding filter rule is applied to the packet, and the above-described process is repeated. If a packet header does not satisfy any of the corresponding rules, or if no rules are found to correspond to the packet header, a default action, usually a DROP action, is carried out on the packet. The default rule is often the last rule in the firewall rule table.

In recent years, security protocols such as Internet Security Protocol (IPsec) have been implemented. Some secure protocols encrypt both the packet and one or more fields in the packet header (such as the inner port, IP address and protocol information). The encryption of the packet header information complicates enforcement of filter rules because a standard ACL is able only to query and evaluate clear, or unencrypted, packet headers.

Further difficulties can be posed by the introduction of an open network ("ON") architecture wherein the router includes a control element (CE) that creates and manages the filter rules and a separate forwarding element (FE) that forwards the packets toward to their destination. Such architectures are "open" in the sense that they can be component-based and the components interact according to open interface protocols. In certain ON systems an effective decryption technique must be implemented across a multiplicity of forwarding elements with a single control element.

DESCRIPTION OF DRAWINGS

Like reference symbols in the various drawings indicate like elements.

DETAILED DESCRIPTION OF ILLUSTRATIVE EMBODIMENTS

A system for filtering encrypted packets can be realized by, for example, uploading an ACL and a Security Information Transport Protocol (SITP) mapping table to a Filter Rule Constructor (FRC) that integrates IPsec security information with packet filter rules and generates a graph of filter chains, or filter rule tables. The graph of filter chains can include a clear filter chain, the first rule of which diverts encrypted packets to an outer chain. The outer chain can be configured to route the encrypted packets to a corresponding inner filter chain, which contains the information necessary to decrypt the packet headers and filter the packets based on the identifiers in the encrypted packet header. The FRC that constructs the graph of filter chains may be disposed in a control element of an ON router. The graph of filter chains can be simultaneously downloaded to and enforced by a plurality of forwarding elements in an ON system. This particular implementation provides an IPsec-based VPN-friendly ON architecture.

Figure 1A:
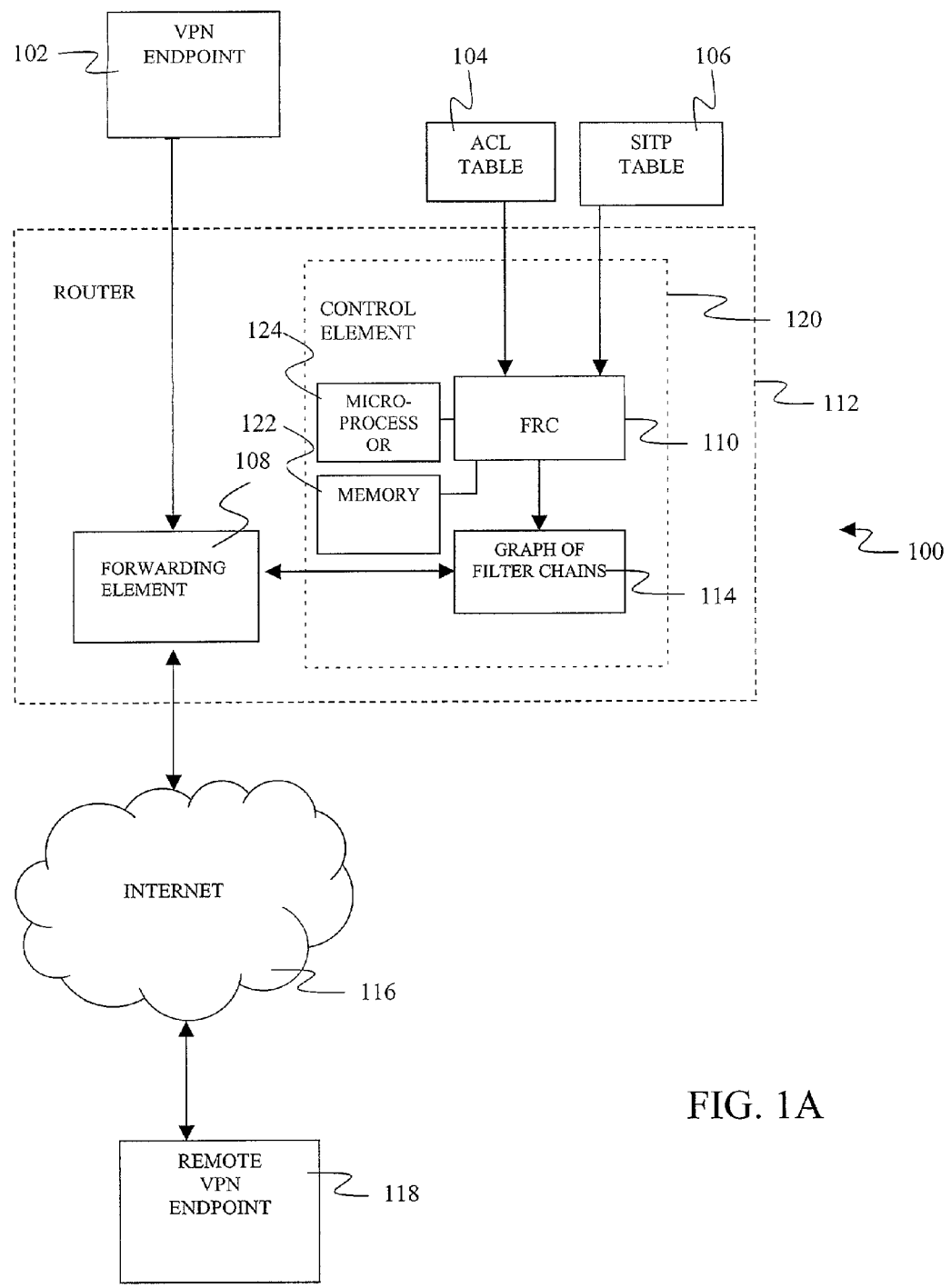
FIG. 1A is a block diagram of an ON router with a single FE and wherein elements of the router apply filter rules to encrypted packet headers.

FIG. 1A shows an illustrative network architecture 100 for filtering packets with encrypted packet headers. The private network ("VPN") shown in FIG. 1A includes a local IPsec endpoint 102 and a remote endpoint 118 accessed via a public domain such as Internet 116. The VPN can optionally include plurality of local networked computers, sometimes referred to as an intranet, in which case there would be a multiplicity of local IPsec endpoints. The VPN can further include additional remote endpoints 118 accessed via any public domain such as the Internet 116. The remote endpoint 118 shown in FIG. 1 is connected to the local IPsec endpoints 102 through the forwarding element 108 in a data network device, which in this embodiment is an ON router 112. The forwarding element can be a combination of hardware and software configured to transmit and route data. The forwarding element 108 includes or is connected to one or more Internet hosts that provide temporary IP addresses to the local VPN endpoint 102. The forwarding element 108 is connected, or networked, with a control element 120 that includes a Filter Rule Constructor (FRC) program run on one or more networked computers having memory 122 and microprocessors 124. In a typical ON router construction, there are multiple forwarding elements 108. Generally, there is at least one forwarding element connected to the Internet host(s) 116 and at lest one forwarding element connected to the VPN 102 or other local computer(s). A plurality of remote users 118 can be connected to the Internet.

In operation, the FRC 110 receives an Access Control Listing (ACL) table 104 and a SITP mapping table 106 and thereafter generates a graph of filter chains 114. The control element downloads the filter chain graph 114 to the forwarding element 108. The forwarding element 108 applies the filter rules embodied in the filter chains 114 to all packets received and route the packets pursuant to the identifiers in the packet headers.

Figure 1B:
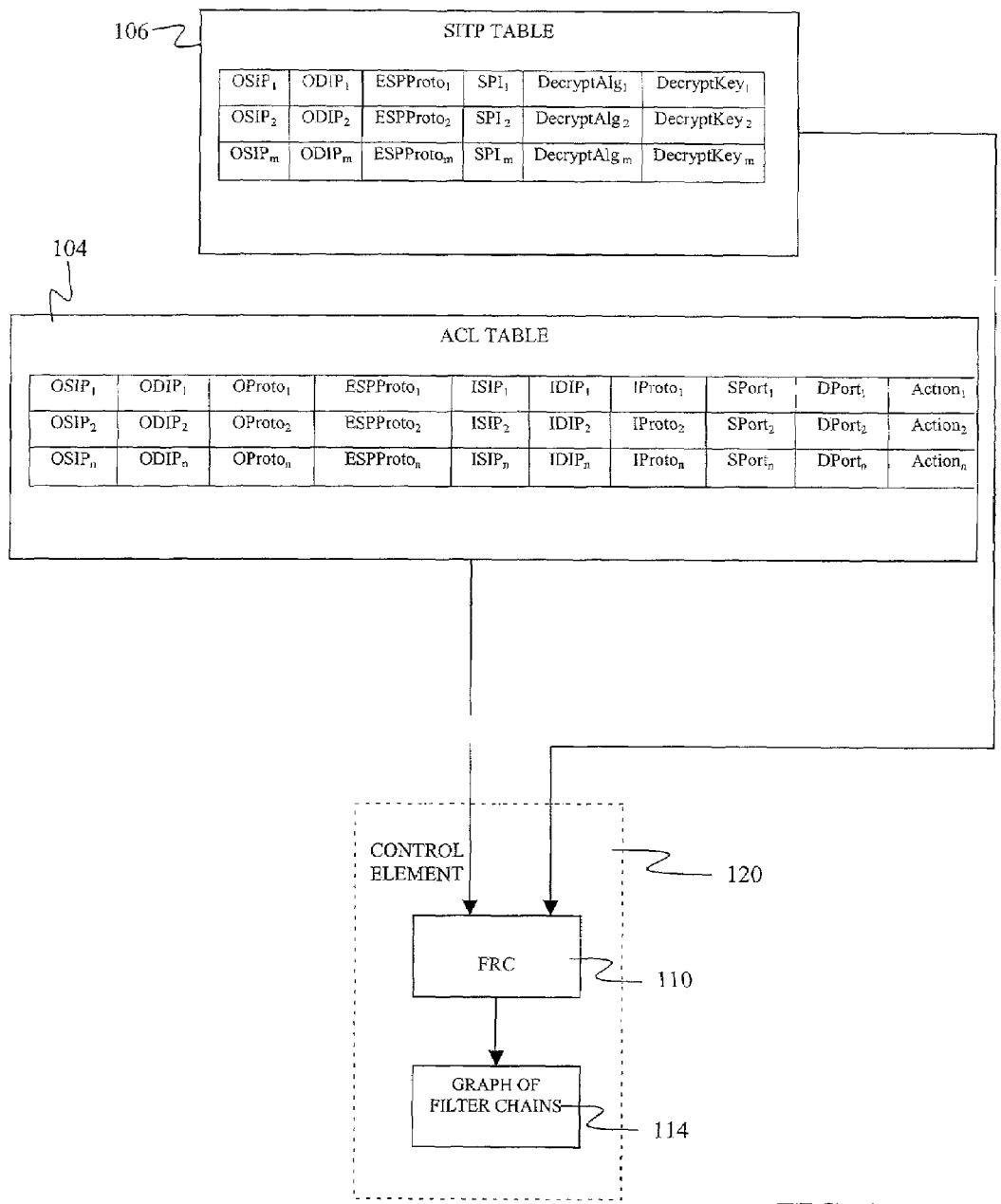
FIG. 1B is a block diagram showing further aspects of the ACL and security information depicted in FIG. 1A.

FIG. 1B depicts in more detail the ACL table 104 and SITP mapping table 106 that are input into the FRC 110. An ACL entry in one implementation constitutes a 9-tuple, or 9 parameter rule, plus an action. The ACL 9-tuple is the outer source IP address (OSIP), the outer destination IP address (ODIP), the outer protocol (OProto), the ESP protocol (ESPProto), the inner source IP address (ISIP), the inner destination IP address (IDIP), the inner protocol (IProto), the source port (SPort), and the destination port (DPort). The action included in the ACL entry is typically ACCEPT or DROP for firewall. Entries of the SITP table are the 4-tuple OSIP, ODIP, ESPProto, and the security payload index (SPI). The SITP table can also include decryption algorithm identifiers and decryption keys for each of the 4-tuples. The identifiers or parameters set forth in the 9-tuple of the ACL entry and the 4-tuple of the SITP entry can be precise values or they can include wildcards or a value range. For example, IDIP can be 144.34.*.2, which will correspond to inner destination IP addresses 144.34.954.2, 144.34.123.2, etc. The ACL table 104 has entries for "n" filter rules (labeled 1, 2, through n). Likewise, the SITP table 106 contains security mapping for "m" IPsec mappings.

Figure 2:
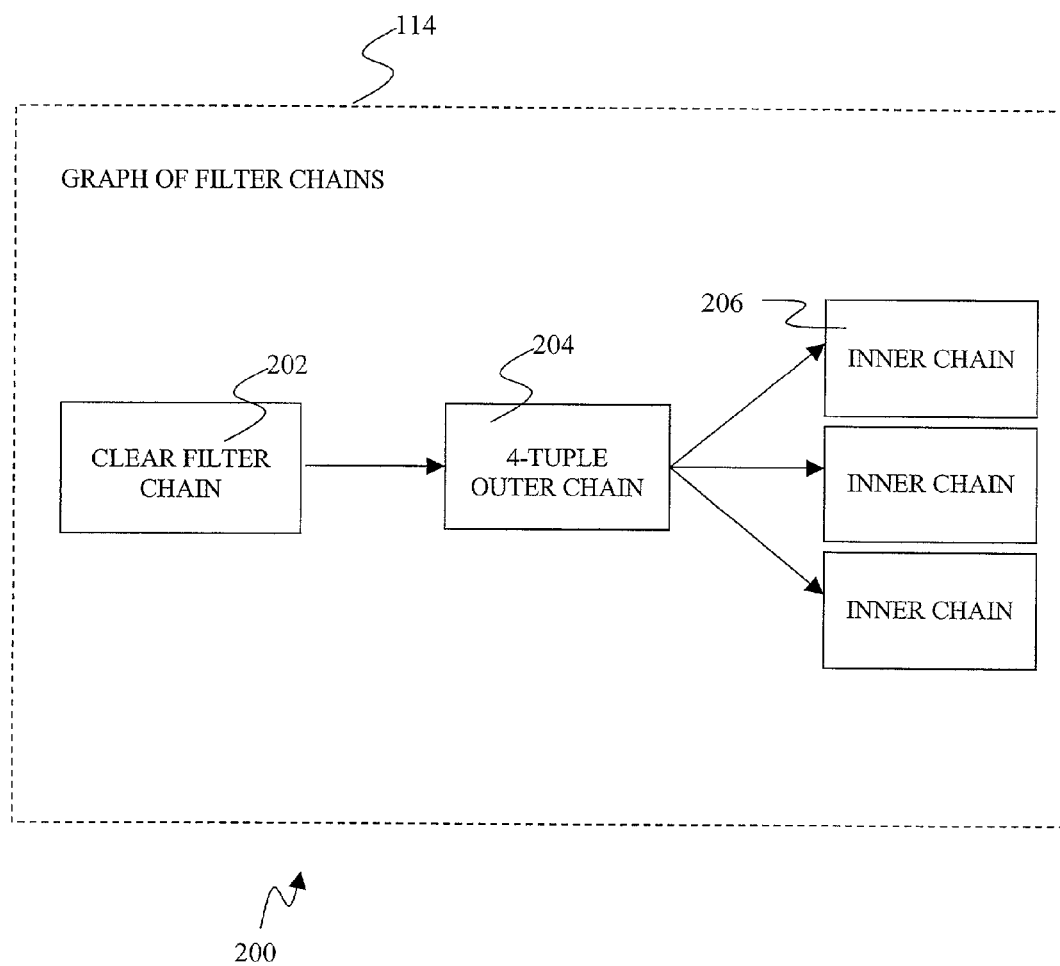
FIG. 2 is a block diagram of an exemplary graph of filter chains generated by the FRC of FIGS. 1A and 1B.

In operation, the FRC 110 merges the ACL table 104, which is adapted primarily for clear packet headers, and the SITP mapping table 106, which describes how packets have certain specified identifiers should be decrypted. The resulting graph of filter chains 114 is shown in FIG. 2. The graph of filter chains can include a clear filter chain 202 that has a plurality of rules to be applied to clear packet headers. The first rule in the clear filter chain 202 can provide that any encrypted packets, such as IPsec encrypted packets, be evaluated by an outer 4-tuple chain 204. The outer chain 4-tuple can include OSIP, ODIP, OProto, and SPI. Packets having headers that correspond to, or match, the 4-tuple values (or ranges of values), can be first decrypted and then its inner part can be evaluated by an inner chain 206 that preferably includes either the 3-tuple ESPProto, DPort, and SPort (in transport mode) or the 6-tuple ESPProto, ISIP, IDIP, IProto, DPort, and SPort (in tunneling mode). Tunneling mode is an ESP mode that encrypts an entire IP packet including the IP header, whereas transport mode is an ESP mode that encrypts the transport layer and higher layers (in the seven layer OSI model) of a packet and leaves the original IP addresses in plaintext. The inner filter rule tables 206 can include both types filter rules. The inner filter chains 206 also include an action such as ACCEPT or DROP that is to be carried out on the packets whose inner headers correspond to the values or ranges of values specified in the inner filter rule tables 206 (an IPsec tunnel mode packet has an inner header and an outer header; the former is assembled by the host and the second is constructed by the device that is providing security services).

It should be noted that in certain tunneling mode implementations, a packet's inner source IP address (ISIP), the inner destination IP address (IDIP), the inner protocol (IProto), the source port (SPort), and the destination port (DPort) are encrypted, while the remainder of the header parameters are clear, or unencrypted. In such embodiments, the outer chain forwards packets based on the clear header information, and the inner chain decrypts the remaining packet headers and then applies the appropriate filter rules.

Figure 3:
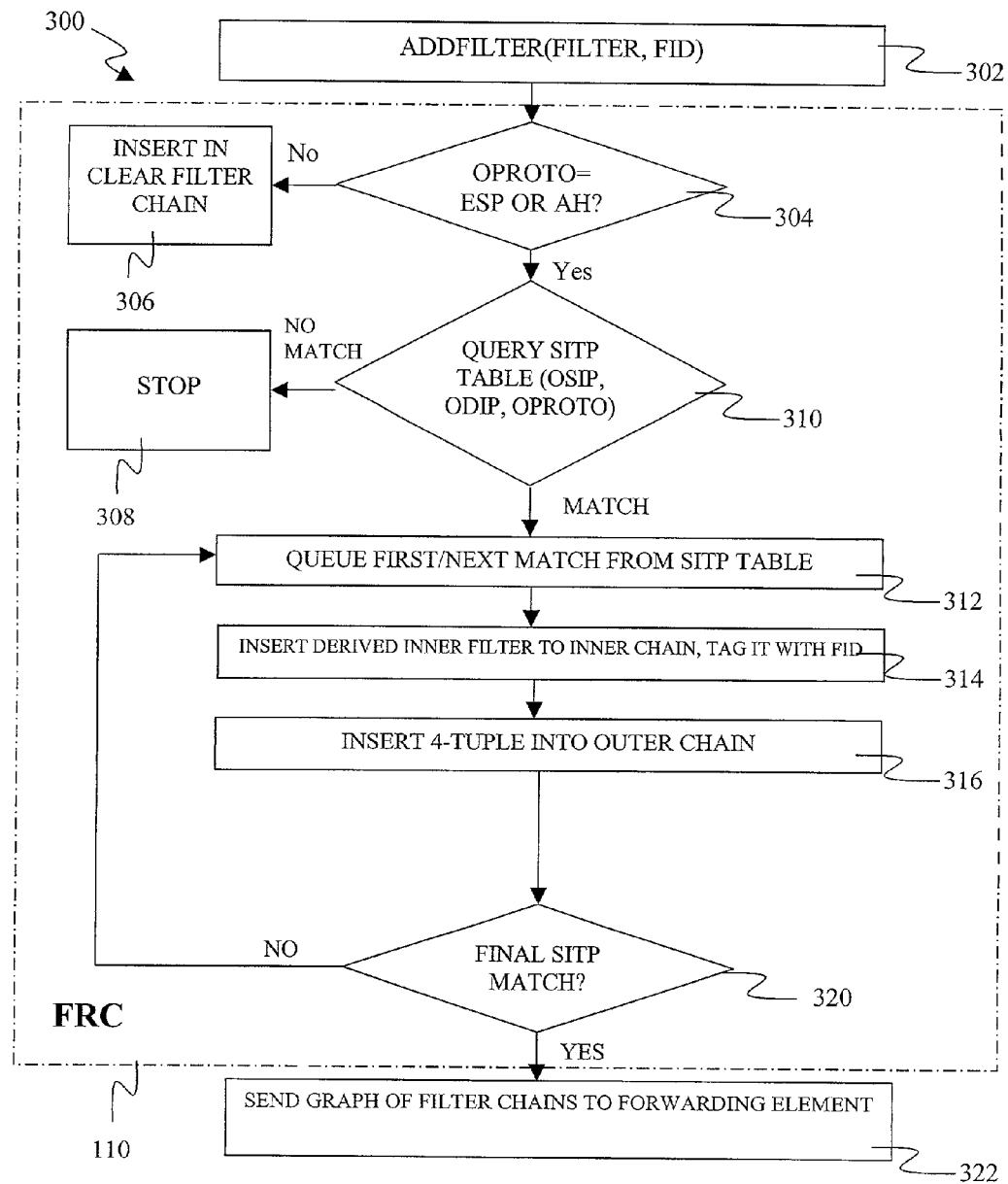
FIG. 3 is a flow diagram showing the process of adding a filter to an ON router's graph of filter chains.

FIG. 3 describes how the FRC 110 adds a filter to the graph of filter chains 114. The client calls the AddFilter protocol with the parameters or identifiers defining the new filter and a "filter ID number" (FID), which can either be generated by the FRC or provided by the client (302). The FRC then compares the OProto value for the new filter specified by the client to a predetermined value or range of values corresponding to secure, or encrypted, packets (304). In this example, the outer protocols ESP and AH indicate IPsec encrypted packet headers. If the outer protocol of the filter is not ESP or AH, then the filter is inserted into the clear filter chain at the priority specified by the client and/or embodied in a firewall rule table. Otherwise, the FRC queries the SITP table 106 for mappings that correspond to the OSIP, ODIP, and OProto parameters specified for the packet (310). If there are no matching mappings, then the SITP information provided by the user is not sufficient to decrypt and filter the packet, and the procedure can simply stop (308). The first matching mapping is queued (312), and the FRC creates an inner filter (either the 3-tuple or the 6-tuple described above plus an associated action such as ACCEPT or DROP) (314). Next, the inner filter is tagged with the filter ID number (316), which as will be seen below facilitates deletion and modification of the filter and also in statistics management. The corresponding 4-tuple is inserted into the outer chain (i.e. OSIP, ODIP, OProto, and SPI) at the priority specified by the user in the firewall rule table (316). This process is repeated for each SITP mapping corresponding to the parameters specified in the AddFilter call (312–320). After the last mapping is processed, the FRC transmits the updated graph of filter chains to the forwarding element 108 for application to packets routed by the ON router 112.

Figure 4:
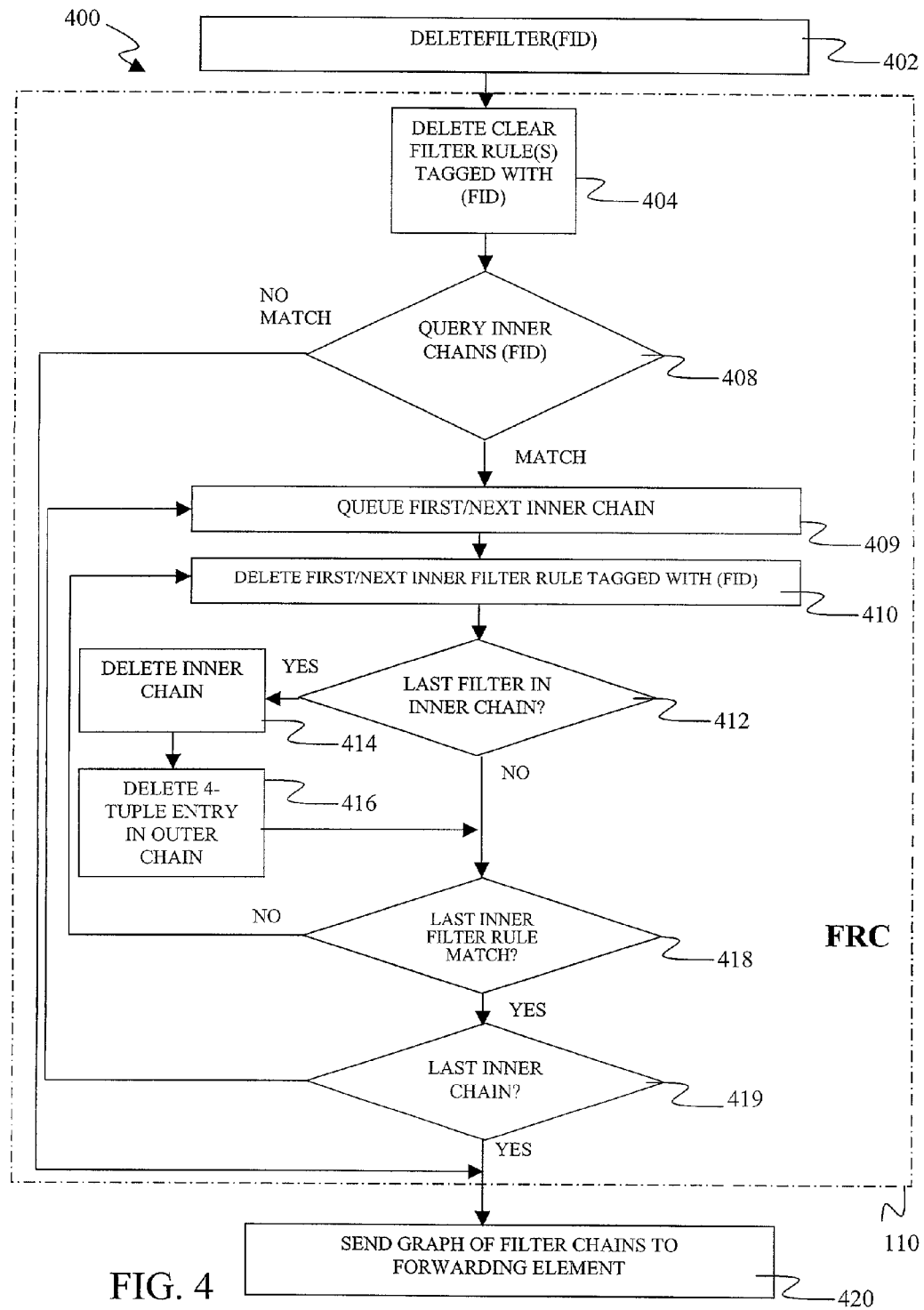
FIG. 4 is a flow diagram showing the process of deleting a filter from the ON router's graph of filter chains.

FIG. 4 describes a sequence that can be implemented to delete a filter from ACL table 104. Upon receipt of a DeleteFilter call specifying a filter ID number, the FRC queries the clear filter chain 202 (404). If there is an FID match in the clear filter chain 202, the FRC deletes the matching clear filter rules from the clear filter chain 202 (406). Otherwise, the FRC, queries the inner filter chains 206 for filter rules that are tagged with the specified filter ID number (408). If there is no match, the FRC can either generate an error message or simply forward the engine to the end of the sequence (418/420), or execute other exception protocols provided by the client. Next, the first matching filter chain is queued (409) and the FRC 110 deletes the first filter rule corresponding to the specified filter ID number (410). If the deleted filter is the last remaining rule in the inner chain 206, then the inner chain is deleted (414) and the corresponding 4-tuple is deleted from the outer chain (416). This process is repeated for all inner filters in the queued chain that have the specified filter ID number (410–418). After the last matching inner filter is processed, the next inner filter chain is queued and the foregoing process is repeated (409–419). Finally, the updated graph of filter chains may be sent from the control element 120 to forwarding element 108 by the FRC 110 (420).

Figure 5:
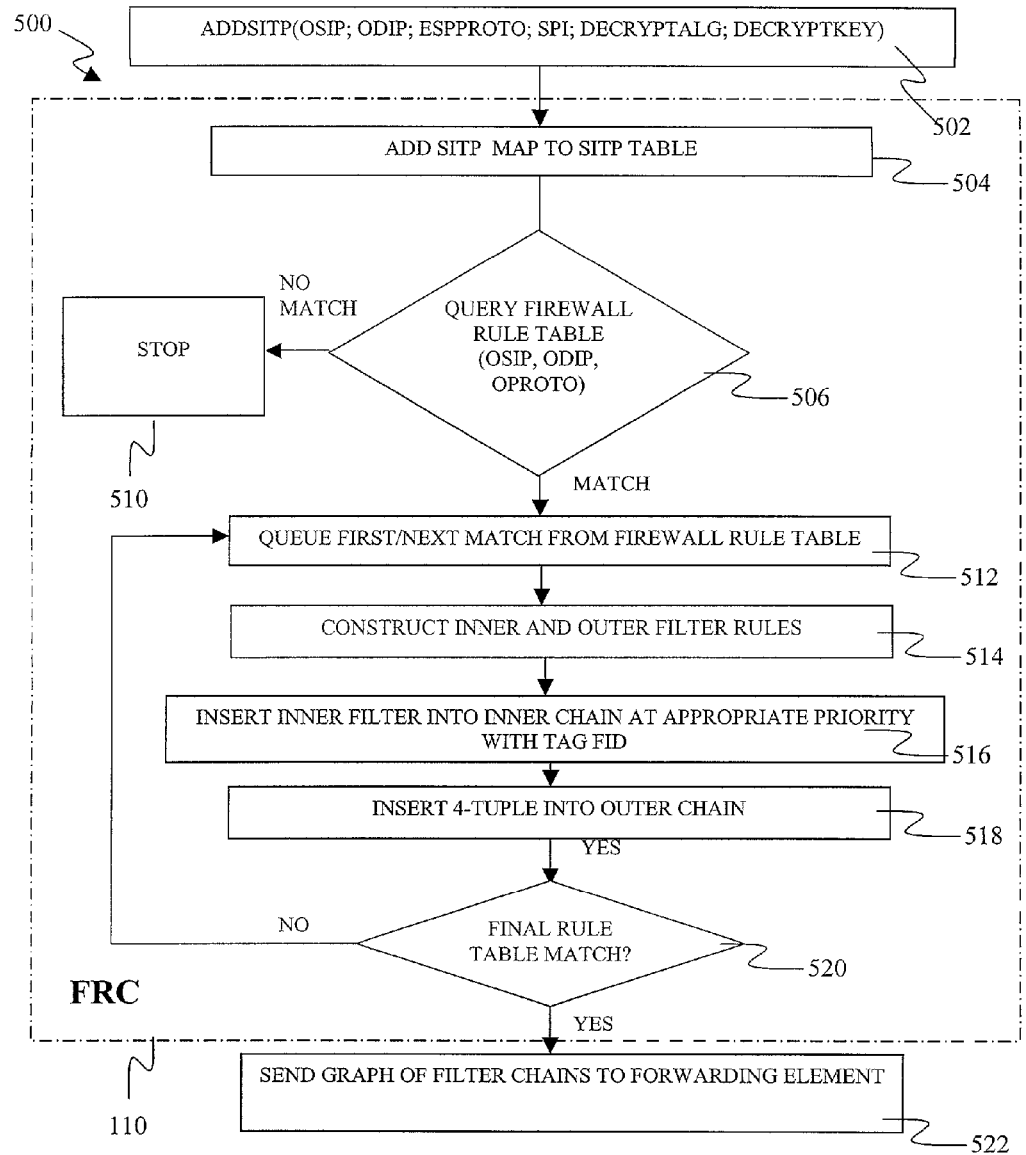
FIG. 5 is a flow diagram showing the process of adding security information to the ON router's graph of filter chains.

FIG. 5 demonstrates how the FRC 110 may add security parameters (i.e. security mappings) to the filter chains 114. In this example, an SITP mapping is added to the SITP mapping table 106, which is then input to the FRC 110. As shown in FIG. 4, the FRC can be configured to receive a AddSITP call and add the SITP mapping to the SITP table 106 (504). Alternately, one or more other program elements can execute the addition of the SITP mapping to the SITP mapping table 106. The FRC 110 may then query the firewall rule table for filter rules corresponding to the specified OSIP, ODIP, and OProto parameters (506). If no match is found, the FRC can create an error message or simply stop (510). The first matching filter rule is then queued for processing (512), and the FRC constructs the inner and outer filter in accordance with the techniques discussed above (514). The inner filter rule is inserted into the corresponding inner chain 206 at the priority specified in the firewall rule table (516). The 4-tuple is then inserted into the outer chain 204 so that corresponding IPsec packet headers can be forwarded to the appropriate inner filter chain 206. The foregoing process is repeated for all matching rules in the firewall rule table (512–520). Finally, the FRC 110 can forward the graph of filter chains from the control element 120 to the forwarding element 108.

Figure 6:
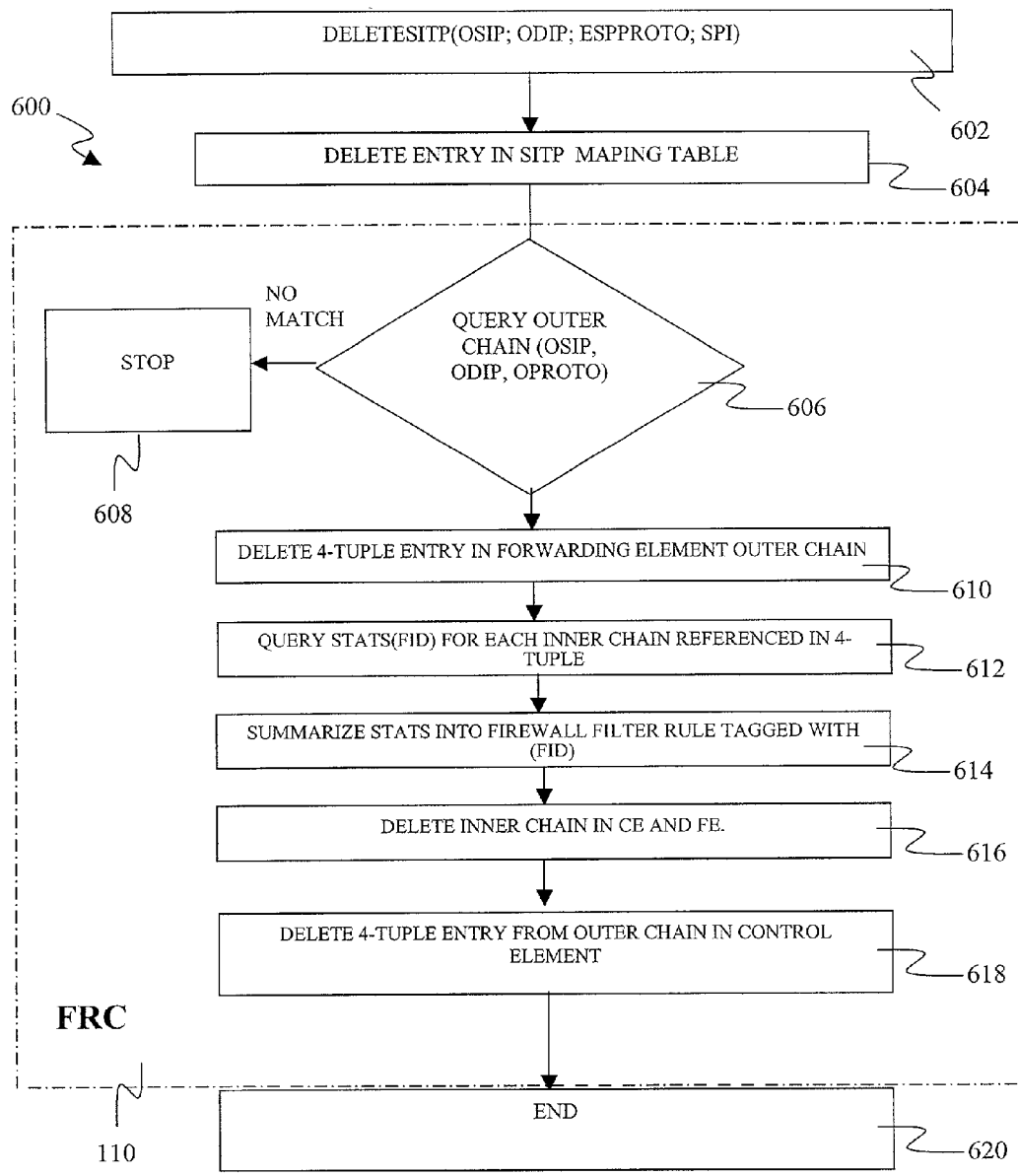
FIG. 6 is a flow diagram showing the process of deleting security information from the ON router's graph of filter chains.

An exemplary set of steps for deletion of a SITP mapping are illustrated in FIG. 6. The client transmits a DeleteSITP call that specifies in one embodiment OSIP, ODIP, ESP-Proto, and SPI (602). The FRC 110 or other program elements delete the corresponding matchings from the SITP mapping table (604). The FRC 110 then queries the outer chain for rules that correspond to the specified OSIP, ODIP, and OProto values (606). If no match is found, then an error message or other exception protocol may be generated or executed (608). The FRC deletes the 4-tuple entry in the outer chain 204 in the forwarding element 108 (610), such that the rule is no longer execution on the data path. The FRC can then execute a procedure to harvest statistical information from the firewall (612–614). The FRC can query the statistics counters that correspond the filter ID numbers referenced in the inner chain to which the outer chain 4-tuples point (which were deleted from the forwarding engine 108) (612). The results can be summarized into the aggregated firewall statistics counters (614), after which the corresponding inner chains in the control element 120 and forwarding element 108 can be deleted. The aggregate statistics can be stored in the firewall table, or ACL table, in a location associated with the filter rule tagged with the filter ID. Lastly, the FRC 110 deletes the 4-tuple in the control element (618).

Figure 7:
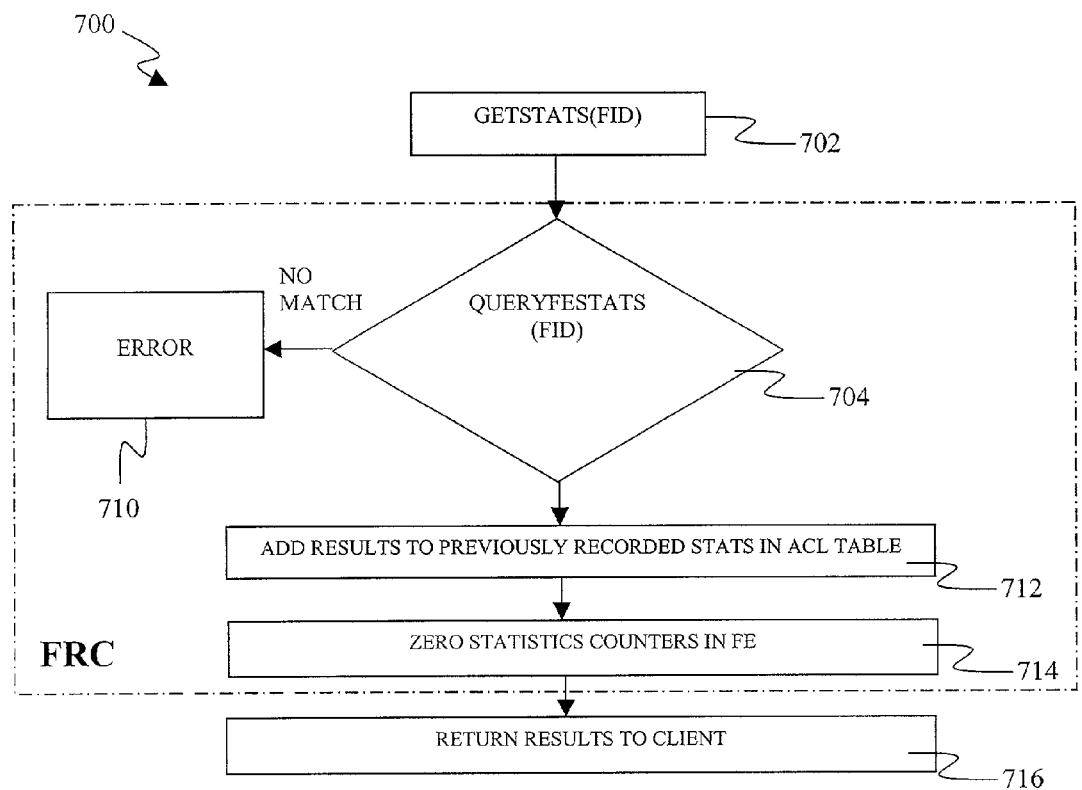
FIG. 7 is a flow diagram showing the process of maintaining and retrieving statistics from the forwarding element.

Statistics can be harvested from the IPsec aware firewall according to the protocol illustrated in FIG. 7. The FRC 110 queries the statistics counters in the forwarding engine 108 for counters that match the specified filter ID number, or fid (704). An error message can generated if no match is found (710), as discussed above. The values specified in the corresponding counters can be added to the previously recorded statistics (712), and the counters in the FE can then be zeroed (714). The results can then be returned to the client, oftentimes a network manager (716).

The foregoing techniques can be customized to the needs of particular network, implemented in a wide variety of network architectures, and used to effectively filter packets encrypted by any number of security protocols. The matching of corresponding parameters or identifiers can be exact matching, range matching or wildcard matching, as noted above. The FRC reside or be executed on multiple elements or platforms. The foregoing filtering methods can be implemented in virtually any type of router, and the applicability of the techniques are by no means limited to ON routers. Similarly, there is no need to have the control element and forwarding element to reside on different platforms, or for that matter to be separate in any respect. The methods can likewise be implemented in networks other than VPNs, including but not limited to WANs, LANs, intranets, and the like. Moreover, there is no need that the firewall be a portal to an external network such as the Internet. Rather, the methods can be advantageously implemented in any network element that receives and transmits encrypted packets or packet headers.

Packets encrypted by other security protocols can be readily filtered in accordance with the teachings set forth above. In such systems, the packet identifiers, parameters, decryption algorithms, and decryption keys (if applicable) can be modified to correspond to the desired encryption protocol.

Various trust models can also be implemented. In the trust model shown in FIGS. 2–7, decryption keys and algorithms are forwarded to the control element, which in turn generates a IPsec friendly graph of filter chains to be implemented by the forwarding element. However, in other trust models, decrypted packet header information can be provided to the control element or forwarding element, which alleviates the need to derive inner filters that contain decryption information. Tuples having different widths and different constituent parameters can be selected for use at each layer of the filter chain; there is no rigid requirement that the specified tuple parameters be present in each filter layer.

Likewise, alternate filter layer arrangements can be selected. For instance, one can readily implement a plurality of clear filter chains and a single filter chain for encrypted packet headers, as will be readily appreciated by those skilled in the art. The encrypted filter chains may be more or less complex and processor-time intensive, depending on the particular tuples and layering selected for a particular application.

Similarly, it will be apparent to those skilled in the art that the specific protocols described above, and their particular sequencing, are merely illustrative embodiments selected for a particular network architecture and security protocol. Unless specifically stated otherwise, the steps of each protocol can be performed in a difference sequence.

The protocols need not be executed by a program in a control element. The component FRC can be embedded into forwarding elements. Alternately, the control element and forwarding element can be merged and controlled by an FRC that does not reside on router hardware. Still another option is for the FRC to reside on the forwarding element platform.

The graph of filter chains need not be in "graph" form. Rather, any desired filter rule set can be provided to the enforcing element in a router architecture.

Similarly, the FRC element(s) need not prepare a filter rule set "offline" and thereafter download it to the forwarding element or other network element that applies the filter rules to routed packets. Rather, the router can execute protocols on a control element and a forwarding element in parallel, as described in FIG. 6 or in the case of unitary control and forwarding elements.

While the above description has been directed primarily to firewalls, those skilled in the art will understand that the above techniques can be applied to other security aware services such as traffic engineering, QoS, load balancing, etc.

The foregoing techniques can be implemented in an almost limitless number of additional manners dictated by particular network architecture(s), security protocols, and other design parameters. The foregoing proposed modifications will be understood as merely illustrative by those skilled in the art. It will be understood that various modifications may be made without departing from the spirit and scope of the invention. Accordingly, other embodiments are within the scope of the following claims.

Aspects of the invention provide for one or more of the following advantages. In selected embodiments, the invention provides a system and method for circuit that integrates security information with packet filter rules. In certain embodiments, a single graph of filter chains is generated for efficient enforcement by a forwarding or routing element. In some embodiments, the IPsec aware classification circuit greatly enriches the programmability of ON routers. In still other embodiments, the foregoing techniques can be used to provide IPsec friendly services, such as firewall and QoS services, to IPsec based networks such as VPNs.

What is claimed is:

1. An access control system comprising:
a router having a plurality of network interfaces for receiving and transmitting packets of data, the router including forwarding elements to apply filter rules to the packets; and
a filter rule constructor engine associated with said forwarding elements to receive access control rules and security information for a security protocol, derive from the access control rules and security information a set of filter rules to be applied to packet headers encrypted with the security protocol, and
transmit the set of filter rules to two or more forwarding elements.

2. The system of claim 1, wherein the filter rule constructor engine also applies the derived set of filter rules to clear packet headers.

3. The system of claim 1, wherein the security protocol is a secure Internet protocol.

4. The system of claim 1, wherein the filter rule constructor engine is on the same platform as the forwarding elements.

5. The system of claim 1, wherein the router is connected to a Virtual Private Network (VPN).

6. The system of claim 5, wherein the router is also connected to an Internet host.

7. The system of claim 1, wherein the set of filter rules includes a filter rule applied to unencrypted packet headers.

8. The system of claim 7, wherein the set of filter rules further includes an outer and inner set of filter rules, wherein the outer set routes the encrypted packet headers to the inner set that decrypts the packet headers.

9. The system of claim 1, wherein the security information is a Security Information Transport Protocol mapping table.

10. The system of claim 9, wherein the SITP table includes a plurality of parameters selected from the group consisting of outer source IP address, the outer destination IP address, ESP protocol, a security payload index, a decryption algorithm, and a decryption key.

11. The system of claim 10, wherein the access control rules are in a table which lists a plurality of parameters selected from the group consisting of outer source IP address, the outer destination IP address, the outer protocol, the ESP protocol, the inner source IP address, the inner destination IP address, the inner protocol, the source port, and the destination port.

12. The system of claim 1, further comprising an engine to collect statistics from counters associated with the set of filter rules.

13. The system of claim 1, wherein the statistics engine is integral with the filter rule constructor engine.

14. A machine-accessible medium with executable instructions stored thereon that, when accessed by a machine, causes the machine to perform the following operations:
receive access control rules and security information for a security protocol;
derive from the access control rules and security information a set of filter rules to be applied to packet headers encrypted with the security protocol; and
transmit the set of filter rules to a router including two or more forwarding elements.

15. The article of claim 14, the instructions further operable to cause the machine to apply the derived set of filter rules to both clear packet headers and packet headers encrypted with the security protocol.

16. The article of claim 14, further including instructions to receive security information for a secure Internet protocol.

17. The article of claim 14, further including instructions to derive a set of filter rules that includes a filter rule applied to unencrypted packet headers.

18. The article of claim 14, further including instructions to derive a set of filter rules that includes an outer and inner set of filter rules, wherein the outer set routes the encrypted packet headers to the inner set that decrypts the packet headers.

19. The article of claim 14, further including instructions to receive security information in the form of a Security Information Transport Protocol mapping table.

20. The article of claim 19, further including instructions to receive a Security Information Transport Protocol mapping table that includes a plurality of parameters selected from the group consisting of outer source IP address, the outer destination IP address, ESP protocol, a security payload index, a decryption algorithm, and a decryption key.

21. The article of claim 14, further including instructions to receive access control rules in the form of a table which lists a plurality of parameters selected from the group consisting of outer source IP address, the outer destination IP address, the outer protocol, the ESP protocol, the inner source IP address, the inner destination IP address, the inner protocol, the source port, and the destination port.

22. The article of claim 14, the instructions further operable to cause the machine to collect statistics from counters associated with the set of filter rules and reset the counters.

23. An access control method, comprising:
receiving access control rules and security information for a security protocol;
deriving from the access control rules and security information a set of filter rules to be applied to packet headers encrypted with the security protocol; and
transmitting the set of filter rules to a router including two or more forwarding elements.

24. The method of claim 23, further comprising applying the derived set of filter rules to both clear packet headers and packet headers encrypted with the security protocol.

25. The method of claim 23, wherein the security protocol is a secure Internet protocol.

26. The method of claim 23, wherein the set of filter rules includes a filter rule applied to unencrypted packet headers.

27. The method of claim 26, wherein the set of filter rules further includes an outer and inner set of filter rules, wherein the outer set routes the encrypted packet headers to the inner set that decrypts the packet headers.

28. The method of claim 23, wherein the security information is a Security Information Transport Protocol mapping table.

29. The method of claim 28, wherein the SITP table includes a plurality of parameters selected from the group consisting of outer source IP address, the outer destination IP address, ESP protocol, a security payload index, a decryption algorithm, and a decryption key.

30. The method of claim 23, wherein the access control rules are in a table which lists a plurality of parameters selected from the group consisting of outer source IP address, the outer destination IP address, the outer protocol, the ESP protocol, the inner source IP address, the inner destination IP address, the inner protocol, the source port, and the destination port.

31. The method of claim 23, further comprising collecting statistics from counters associated with the set of filter rules and resetting the counters.

* * * * *